United States Patent
Shimizu et al.

(10) Patent No.: US 11,548,458 B2
(45) Date of Patent: Jan. 10, 2023

(54) BUMPER CROSS MEMBER FOR A MOTOR VEHICLE AND METHOD FOR THE PRODUCTION OF A BUMPER CROSS MEMBER

(71) Applicants: Benteler Automobiltechnik GmbH, Paderborn (DE); Honda Motor Co., Ltd., Tokyo (JP)

(72) Inventors: Tomohiro Shimizu, Utsunomiya (JP); Frode Paulsen, Gjøvik (NO); Atsushi Hasegawa, Saitama (JP); Takayuki Fujii, Saitama (JP); Norikazu Matsuura, Saitama (JP); Noriaki Ito, Saitama (JP)

(73) Assignee: Benteler Automobiltechnik GmbH, Paderborn (DE)

( * ) Notice: Subject to any disclaimer, the term of this patent is extended or adjusted under 35 U.S.C. 154(b) by 189 days.

(21) Appl. No.: 17/141,842

(22) Filed: Jan. 5, 2021

(65) Prior Publication Data

US 2022/0212615 A1 Jul. 7, 2022

(51) Int. Cl.
B60R 19/02 (2006.01)
B60R 19/18 (2006.01)
(Continued)

(52) U.S. Cl.
CPC .......... B60R 19/023 (2013.01); B21C 23/142 (2013.01); B21C 35/023 (2013.01); B60R 19/18 (2013.01)

(58) Field of Classification Search
CPC ..... B60R 19/023; B60R 19/18; B21C 23/142; B21C 35/023
See application file for complete search history.

(56) References Cited

U.S. PATENT DOCUMENTS 4,961,603 A * 10/1990 Carpenter ............... B60R 19/18
293/154
5,277,462 A * 1/1994 Verzelli ................... B60R 19/26
293/134
(Continued)

FOREIGN PATENT DOCUMENTS

DE 600 05 834 7/2004
DE 102016210880 12/2017
(Continued)

OTHER PUBLICATIONS

English European Search Report dated Apr. 8, 2022 in corresponding European patent application No. EP 21 21 6811.

*Primary Examiner* — D Glenn Dayoan
*Assistant Examiner* — Melissa Ann Bonifazi
(74) *Attorney, Agent, or Firm* — Henry M. Feiereisen LLC

(57) ABSTRACT

A bumper cross member for a motor vehicle is produced from an extruded hollow profile and has a front side forming an impact side, a rear side in opposition to the front side, end zones configured for connection to the motor vehicle, a central zone extending between the end zones and bent toward the impact side, and top and bottom sides connecting the rear side with the front side. Each of the top and bottom sides has a projecting flange which is separated from the rear side by a separation cut configured to end shy of the end zones so that the flanges are connected with the bumper cross member in the end zones.

14 Claims, 7 Drawing Sheets

(51) Int. Cl.
*B21C 23/14* (2006.01)
*B21C 35/02* (2006.01)

(56) References Cited

U.S. PATENT DOCUMENTS

| | | | |
|---|---|---|---|
| 6,354,641 | B1 | 3/2002 | Schroeder et al. |
| 6,764,119 | B2 * | 7/2004 | Bladow .................. B60R 19/18 293/122 |
| 10,800,366 | B2 | 10/2020 | Adler et al. |
| 2009/0267368 | A1 | 10/2009 | Hashimura |

FOREIGN PATENT DOCUMENTS

| | | |
|---|---|---|
| EP | 0 434 240 | 6/1991 |
| EP | 2 322 387 | 5/2011 |

* cited by examiner

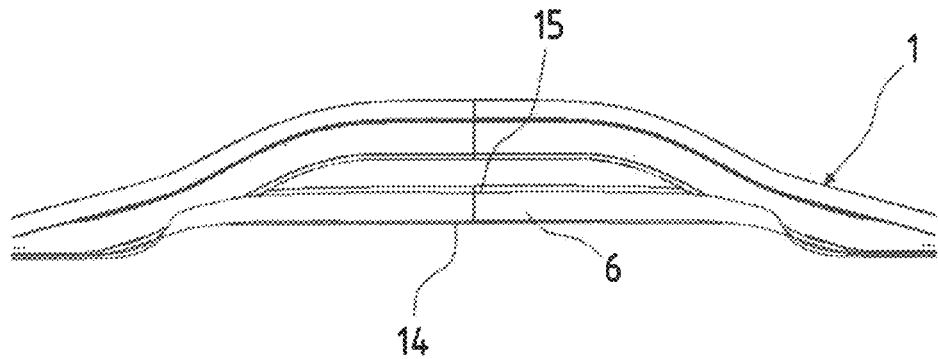
FIG. 12
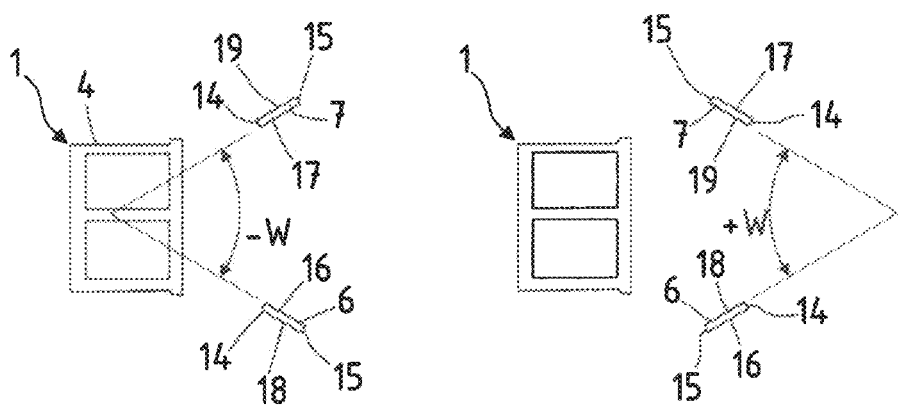
FIG. 13b
FIG. 13a

BUMPER CROSS MEMBER FOR A MOTOR VEHICLE AND METHOD FOR THE PRODUCTION OF A BUMPER CROSS MEMBER

BACKGROUND OF THE INVENTION

The present invention relates to a bumper cross member for a motor vehicle and to a method for the production of a bumper cross member.

It would be desirable and advantageous to provide an improved bumper cross member for a motor vehicle and improved method for the production of a bumper cross member and to obviate other prior art shortcomings.

SUMMARY OF THE INVENTION

According to one aspect of the present invention, a bumper cross member for a motor vehicle is produced from an extruded hollow profile and includes a front side forming an impact side, a rear side in opposition to the front side, end zones configured for connection to the motor vehicle, a central zone extending between the end zones and bent toward the impact side, and top and bottom sides connecting the rear side with the front side and having each a projecting flange which is separated from the rear side by a separation cut configured to end shy of the end zones so that the flanges are connected with the bumper cross member in the end zones.

The term "side", as used in the description relates to the position of the side in relation to the cross section of the bumper cross member. A side may have gradations, bevels, depressions or roundings and does not necessarily involve a straight wall. With respect to "hollow profile", it is currently preferred to use a hollow profile that has a rectangular base configuration.

In accordance with the present invention, the extruded hollow is cut to a required length and forms the starting structure for producing a bumper cross member. The flanges of the extruded hollow profile advantageously point in opposite directions, i.e. upwards and downwards. The end zones may have outer ends sized to project beyond a connection zone with the motor vehicle. The bumper cross member is bent towards the impact side whereas the end zones are bent away from the impact side. Viewed from the middle of the motor vehicle, the bumper cross section has therefore a substantially concave profile in correspondence to the contour of the motor vehicle and further parameters.

In accordance with the present invention, the flanges are separated in the central zone of the bumper cross member from the rear wall by a separation cut. The separation cut does not extend over the entire length of the bumper cross member and ends shy of the end zones. The bumper cross member with the separation cut involves a single-piece structure that has all the walls and also the flanges produced by the original and common extrusion process and thus connected to one another in one piece of a same material.

A bumper cross member in accordance with the present invention affords greater constructive freedoms because the regions of the flanges as separated from the rear wall may have in the end product a different profile than the rear wall of the bumper cross member. Advantageously, due to the separation cut and a subsequent forming operation, the distance of the separated regions of the flanges from the rear wall is increased. In combination with an arcuate curvature of the bumper cross member toward the impact side, an arch is established with two parallel chords, with the two chords being formed by the separated regions of the flanges. As a result, the flanges extend in the central area advantageously straight and transversely to the longitudinal vehicle axis, while the bumper cross member is curved in the area of the hollow profile.

The rear portion of the cross member formed by the chord-like flanges is able to absorb stress which in the event of an impact pushes the ends of the front portion of the cross member apart. The flanges are responsive to a tensile stress while the front side or impact side of the bumper cross member is responsive to pressure. As a consequence of the increased distance of the flanges from the rear side, the section modulus is enhanced against bending, without increasing the overall weight of the extruded hollow profile. The present invention thus provides a teaching as to enable production of a bumper cross member from a single hollow profile, with the bumper cross member having a front first cross member and a rear second cross member, without the two cross members requiring interconnection by an additional manufacturing step. Overall production is thus possible in a cost-efficient manner. A bumper cross member according to the present invention thus includes a central zone with two cross members behind one another.

According to another advantageous feature of the present invention, the flange can have a front surface and a rear surface, with the front surfaces or the rear surfaces of the flanges facing one another in the central zone. Advantageously, the rear and front surfaces extend in parallel relationship, with the flanges being bent in the central zone about their own longitudinal axis such that the front surface or the rear surface of a flange faces the front surface of rear surface of the other flange. In this context, the term "facing one another" is to be understood that both front surfaces or rear surfaces define an angle of less than 90°, in particular less than 45°. Currently preferred is an angle of less than 20°. The surfaces point upwards and downwards, respectively, whereas the surface normals of the respectively other surfaces intersect. Angling or turning of the flanges reduces the structural height of the bumper cross member in the central zone without adversely affecting the stiffening feature of the flanges. Due to the partial separation of the flanges, in particular due to the angling, additional options for air intake for a radiator of the motor vehicle are created.

The partial turning and twisting of the flanges also effect a shortening of the flanges. This shortening compensates, at least in part, a shortening of the bumper cross member resulting from the bending of the hollow profile toward the impact side. In addition, the profile of the flanges may include bends in longitudinal extension to further shorten the overall length.

According to another advantageous feature of the present invention, the front surfaces or the rear surfaces of the flanges can define in the central zone an angle in a range of ±60°, advantageously of ±40°. Currently preferred is an angle in a range of ±20°. The reference to the positive and negative signs is hereby to be understood that the flanges have separation cut edges which either point to the hollow profile or point away from the hollow profile.

Of course, it is also conceivable within the scope of the present invention, to refrain from turning the flanges or front and rear surfaces. In this case, the flanges or front and rear surfaces extend substantially vertical in correspondence with the installation position of the bumper cross member.

The central zone of the hollow profile may be stretched, i.e. its length may be increased in order for the flanges to be under a tensile stress and to act as tie bar which is responsive to tensile stress.

Without increasing the structural volume or weight of the flanges at the rear end of the hollow profile, provisions are made available for connections that are produced as the hollow profile is extruded. The difference to multipart structures, there is no need for welding operations when producing the flanges. The production of a bumper cross member according to the present invention becomes therefore substantially more cost-efficient and is faster and more effective to make.

According to another advantageous feature of the present invention, the front surfaces or the rear surfaces of the flanges can extend in the central zone substantially parallel to the topside and bottom side of the cross member, i.e. substantially horizontal. Advantageously, the front surfaces or the rear surfaces of the flanges are turned by 90°. When implementing the separation cut and the turning operation in one stroke, the provision of an angle that deviates from 90° is possible as a result of a springback of the material.

The turning operation is advantageously executed chronologically at least in part prior to executing the separation cut. The use of a single stepped forming and cutting tool is possible for this purpose. This tool is configured such that the forming component contacts first the flanges to turn them and then a cutting component executes with a cutting edge the separation cut in the same stroke, while the hollow profile is supported in the region of the rear wall.

The turning of the separated flanges in the central zone results in a smaller height of the bumper cross member in the central zone than in the end zones thereof. The flanges assume the task in the end zones to connect the bumper cross member with the motor vehicle. According to another advantageous feature of the present invention, the rear surfaces of the flanges and the rear side can therefore have a same orientation in the end zones, i.e. oriented substantially in vertical direction of the motor vehicle.

According to another advantageous feature of the present invention, transition zones can be provided between the central zone and the end zones. The orientation of the front and rear surfaces of the flanges changes in the transition zones. The front surfaces and the rear surfaces of the flanges in the transition zones can have an orientation which is twisted gradually in the transition zones by 60°-90°, advantageously by 70°-90°. Currently preferred is a turning of the front surfaces and the rear surfaces of the flanges in the transition zones by 80°-90°. As a result, the front surfaces and the rear surfaces of the flanges face one another. A gradual transition is to be understood as relating to a change in a direction of the flanges which is not sudden, i.e. the change in direction is not implemented over a very short length portion. In this way, the presence of material stress that induces deformation is eliminated.

According to another advantageous feature of the present invention, the transition zones have each a length and the flanges have each a height, with the length of the transition zone corresponding to at least twice the height of the flange. Currently preferred is a minimum length of the transition zone which length is two to four times greater than the height of the flange. In this way, a smooth transition is realized in the shape of a helical curvature.

The flanges can be angled by 60°-90°, advantageously by 70°-90°, Currently preferred is an angling of the flanges by 80°-90°. The angling of the flanges is realized at least in part, advantageously substantially, while the flanges are still connected to the hollow profile. After undergoing the separation cut, any further forming operations of the structural parts may be implemented independently from one another.

According to another advantageous feature of the present invention, the separation cut can extend up to the transition zones. As a consequence of the provision of a relatively long separation cut, the flanges can be manipulated and bent more easily. In addition, the long separation cut enables a simpler forming operation of the hollow profile regardless of the profile of the flanges.

The hollow profile absorbs the main stress of the bumper cross member in the event of an impact. The flanges provide support of the hollow profile and can be shifted in a targeted manner to the desired position in relation to the hollow profile in view of the long separation cut.

According to another advantageous feature of the present invention, the flanges can be configured in a direction toward the impact side with a curvature which is smaller to the impact side than a curvature of the hollow profile toward the impact side. In addition, the bend of the flanges can be provided advantageously only in short length portions, so that the major length portion of the flanges extend straight like a chord. As a result, the flanges, when viewed from the impact side, are spaced in the central zone from the rear side by a distance. This distance gradually decreases toward the end zones.

According to another advantageous feature of the present invention, the distance can be in a range of 5 to 200 mm.

The bend of the flanges or the course of the bend in impact direction deviates from the course of the bend of the hollow profile, in particular in the transition zones. Advantageously, the central zone is configured in such a way that the hollow profile and the flanges extend substantially in parallel relation over a particular length portion. The bumper cross member which is bent in impact direction has regions of greater bends, advantageously in the transition zones, in which the flanges are also bent. The transition zone of the cross member or hollow profile is advantageously greater or longer than the transition zone of the flanges.

According to another advantageous feature of the present invention, the flanges can have a separation cut edge and a free edge in opposition to the separation cut edge. Currently preferred is a configuration in which the free edge points away in the central zone from the rear side of the cross member. As an alternative, it is also conceivable to first separate the flanges in at least one area and then following the separation to turn the flanges about the longitudinal axis in such a manner that their free edges point in a direction toward the impact side, while the separation cut edge is bent backwards. However, for manufacturing reasons, it may be more beneficial to turn the flanges backwards, so that the free edges point toward the motor vehicle and the separation cut edges point in a direction toward the front side of the bumper cross member. It is, of course, also possible within the scope of the present invention to turn the flanges differently, so that ultimately a rear surface of one flange points to a front surface of the other flange.

According to another advantageous feature of the present invention, the hollow profile can be embodied as a circumferentially closed hollow profile with at least one chamber. The hollow profile may also have separation walls in its interior so as to realize a multi-chamber profile. Such a stiffening of the hollow profile can be easily realized through an extrusion process in a cost-efficient manner. The internal structure of the hollow profile can be configured completely independent from the configuration of the flanges.

The flanges themselves do not constitute hollow profiles. Advantageously, the flanges involve essentially flat webs of uniform height as determined by the extrusion process. The height or depth of the hollow profile can vary in longitudinal direction by compressing at least one area of the hollow profile. The hollow profile can advantageously undergo a material removing process after being produced in order to create cutting areas, e.g. to provide openings for a towing device or to connect the hollow profile with a crash box.

According to another aspect of the present invention, a method for the production of a bumper cross member includes forming an extruded hollow profile with a hollow chamber and upper and lower sides each with flanges directed in opposite directions, partly separating the flanges by shifting a stamping tool in a direction from a front side to a rear side of the hollow profile and separating the flanges in a central zone of the hollow profile, and bending the central zone of the hollow profile in a direction of the front side so as to increase a distance of the flanges from the rear side in the central zone.

In accordance with the present invention, the flanges remain connected in the end zones of the hollow profile with the hollow profile.

According to another advantageous feature of the present invention, the flanges can be formed in the central zone such that front surfaces or rear surfaces of the flanges face one another in the central zone. Advantageously, the flanges are bent by 60°-90°. The optional forming operation may be implemented at least in part prior to the cutting operation, advantageously over an angle range of the afore-mentioned 60°-90°. The forming operation may also be continued after the separation has been executed. The separation operation may also represent in intermediate step during the optional forming operation. The optional forming operation and the separation operation can be executed advantageously in a single stroke by means of a same stamping tool. For this purpose, the stamping tool is moved past the topsides and bottom sides of the flanges. The stamping tool is maneuvered in such a way that it moves from the front side in a direction of the flanges, with the flanges being turned backwards in stroke direction. When the desired turning has been implemented, the stamping tool is further shifted until a cutting edge of the stamping tool acts on the flanges to separate the flanges from the topside and bottom side of the hollow profile. During the entire process, the end zones of the hollow profile, including the flanges, are fixed in place, so that the flanges will not undergo a deformation in this area. Formed between the shaped central zone and the fixed end zones of the flanges is the transition zone in which the flanges are helically turned by about 60° to 90°. In this variant of the process, the front surfaces of the flanges point outwards after undergoing the forming operation. If it is desired to provide front surfaces that should point inwards, the forming operation is executed in an opposite direction, so that the separation cut edges of the flanges point away from the rear side of the hollow profile.

In a following manufacturing step, the hollow profile is bent by shifting the ends relative to the central zone in impact direction. At the same time, the end position of the flanges in relation to the rear side is adjusted such that the free edge does not project at the rear beyond the end zones, but rather extend in the central zone at a distance to the end zones. The maximum distance may be 5 to 200 mm, advantageously 30 to 150 mm.

According to another advantageous feature of the present invention, the hollow profile can be stretched in its length in order to tension the exposed regions of the flanges. The ends can ultimately be trimmed and provided with openings for attachment to a motor vehicle. The bumper cross member may further undergo a calibration step to assume its desired shape.

BRIEF DESCRIPTION OF THE DRAWING

Other features and advantages of the present invention will be more readily apparent upon reading the following description of currently preferred exemplified embodiments of the invention with reference to the accompanying drawing, in which;

FIG. 12 is a top view of a finished bumper cross member with differently formed flanges;

FIG. 13a is a cross section of a central zone of a bumper cross member with confronting rear surfaces;

FIG. 13b is a cross section of a central zone of a bumper cross member with confronting front surfaces;

DETAILED DESCRIPTION OF PREFERRED EMBODIMENTS

Figure 1:
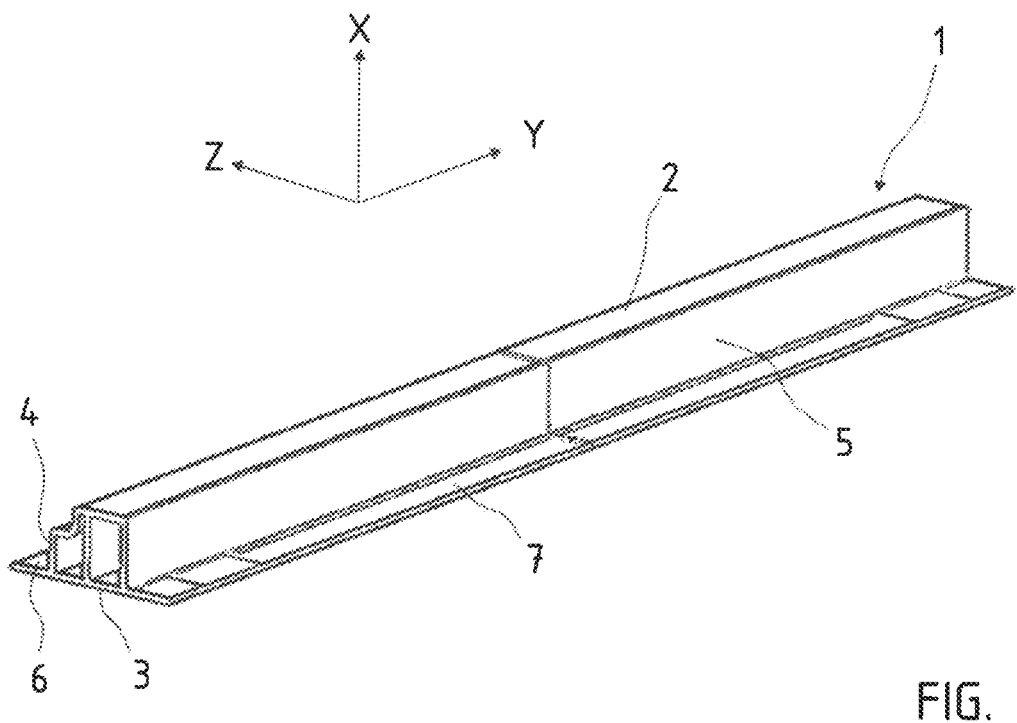
FIG. 1 is a perspective view of one embodiment of a hollow profile for the production of a bumper cross member according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of one embodiment of a hollow profile, generally designated by reference numeral 1 for the production of a bumper cross member according to the present invention. The hollow profile 1 as a semi-finished product has two chambers and is made of an aluminum ahoy. The hollow profile 1 is produced through extrusion and cut to the desired size.

The hollow profile 1 and the bumper cross member produced from the hollow profile 1 has a front side 2 which in the drawing plane of FIG. 1 is on top and represents an impact side. In relation to a motor vehicle coordinate system, the x axis points upward, the y axis points in the drawing plane to the right, and the z axis to the left into the drawing plane. The hollow profile 1 has a rear side 3 which is thus below in the drawing plane. An observer looks upon a bottom side 5, whereas a topside 4 faces away from the rear side 3. Upper and lower flanges 6, 7 are located in a plane of the rear side 3 and extend perpendicular to the topside 4 and bottom side 5 beyond the topside 4 and bottom side 5. The flanges 6, 7 are each straight and arranged diametrically.

Figure 2:
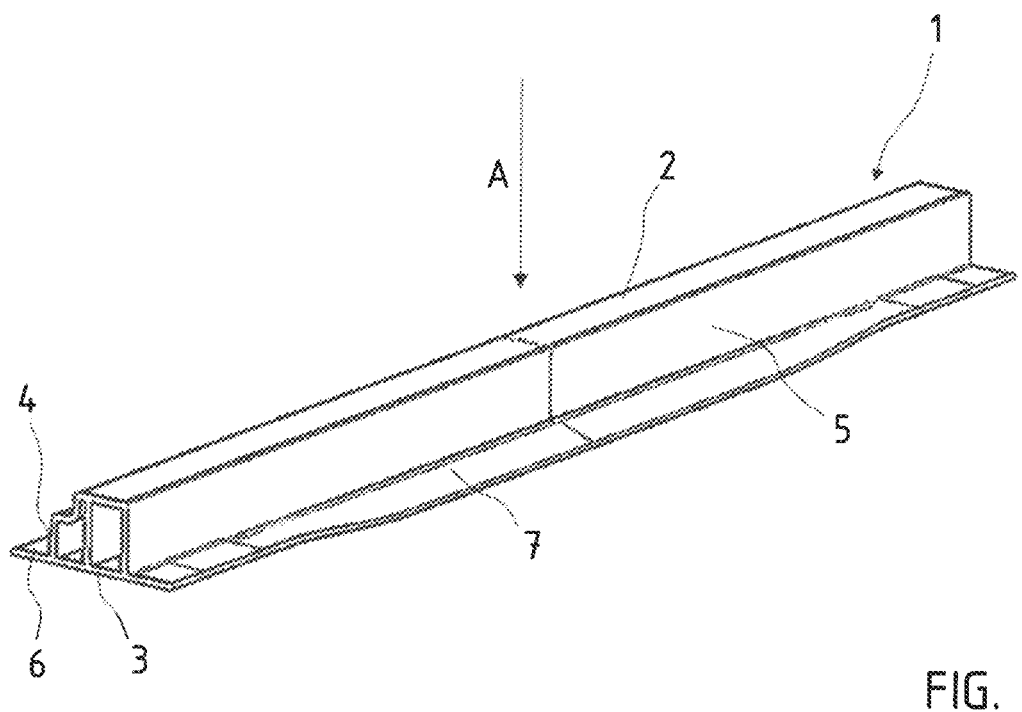
FIG. 2 is a perspective view of the hollow profile as flanges thereof are formed.

To produce a bumper cross member from the hollow profile 1, the flanges 6, 7 are formed in a central zone 11. In a manner not shown in greater detail, a forming tool is moved in an impact direction, as indicated by arrow A, past the topside 4 and the bottom side 5 in order to shape the flanges 6, 7 downwards and rearwards, as shown in FIG. 2, while the flanges 6, 7 are secured in place in end zones 8, 9 during the forming operation. For sake of simplicity, FIG. 2 depicts the forming operation only in connection with the lower flange 7. It will be understood by persons skilled in the art, that the upper flange 6 undergoes a same forming operation.

Figure 3:
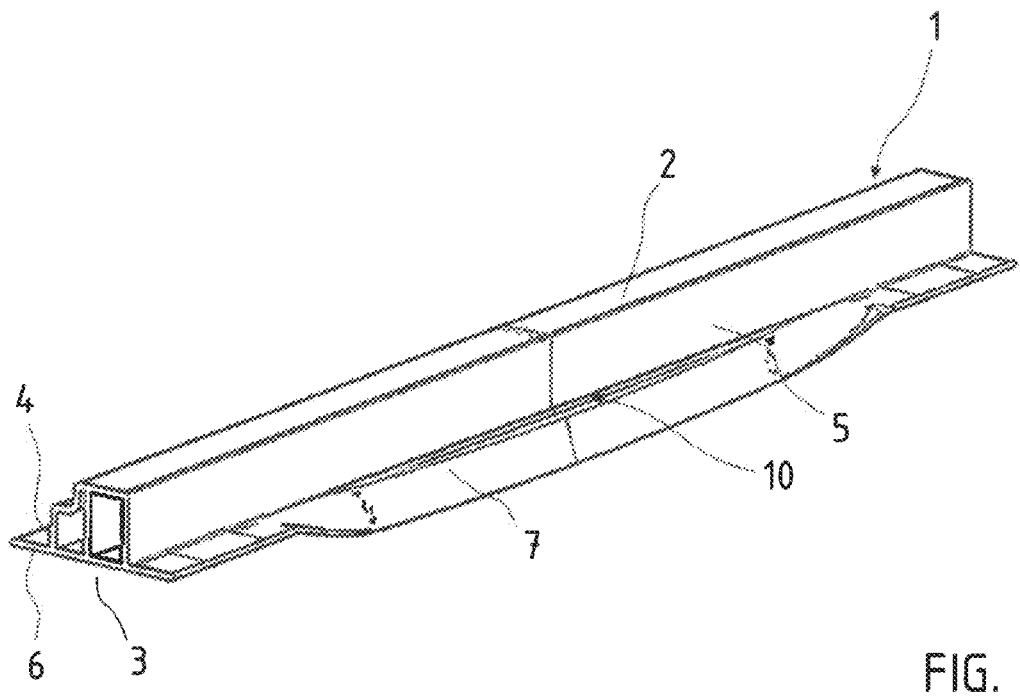
FIG. 3 is a perspective view of the hollow profile as the flanges thereof are continued to be formed and undergoing a separation cut.
Figure 4:
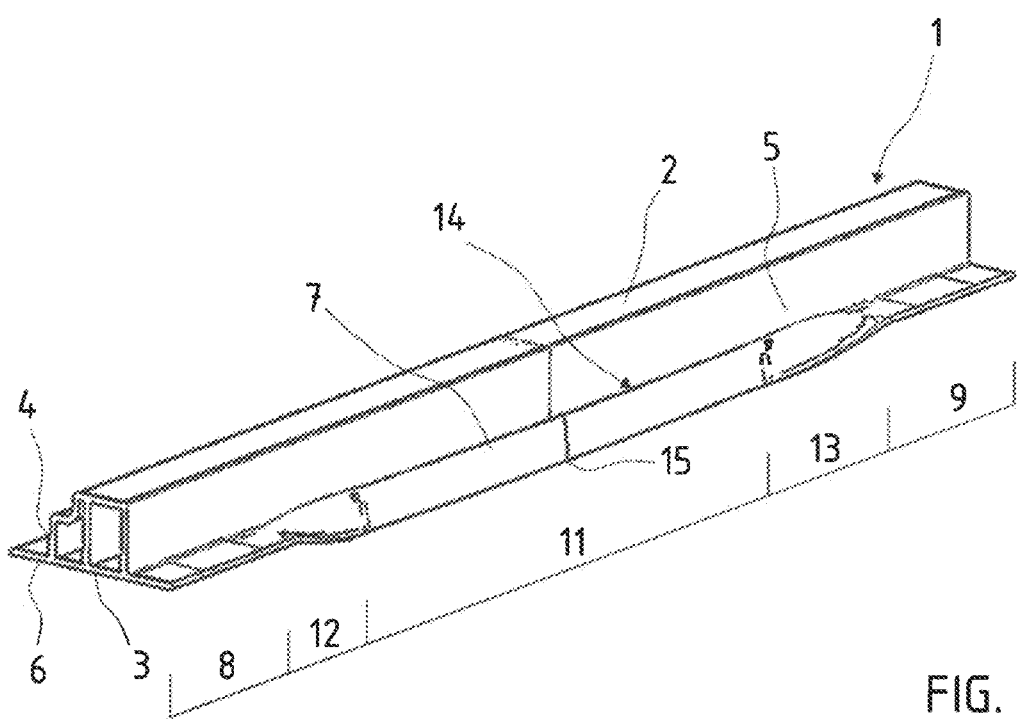
FIG. 4 is a perspective view of the hollow profile, depicting the partly separated flanges in a further forming situation.

FIG. 3 shows a further method step during the forming operation, in which a separation cut 10 is carried out to partly separate the flanges 6, 7 from the hollow profile 1. The separation cut 10 extends in a longitudinal direction (y direction) and in immediate proximity to the topside 4 and the bottom side 5. At the same time, the flanges 6, 7 undergo a further forming operation in the central zone 11, as shown in FIG. 4. During this continued forming operation, the flange 7 that has been separated in the central zone 11 is bent by almost 90°. Adjoining the central zone 11 on opposite ends are transition zones 12, 13, where the flanges 6, 7 assume a helical shape over an angle of nearly 90°. A separation cut edge 14 of the flange 7 points upwards in the drawing plane, i.e. toward the front side 2, whereas a free edge 15 of the flange 7 points away from the front side 2.

Figure 5:
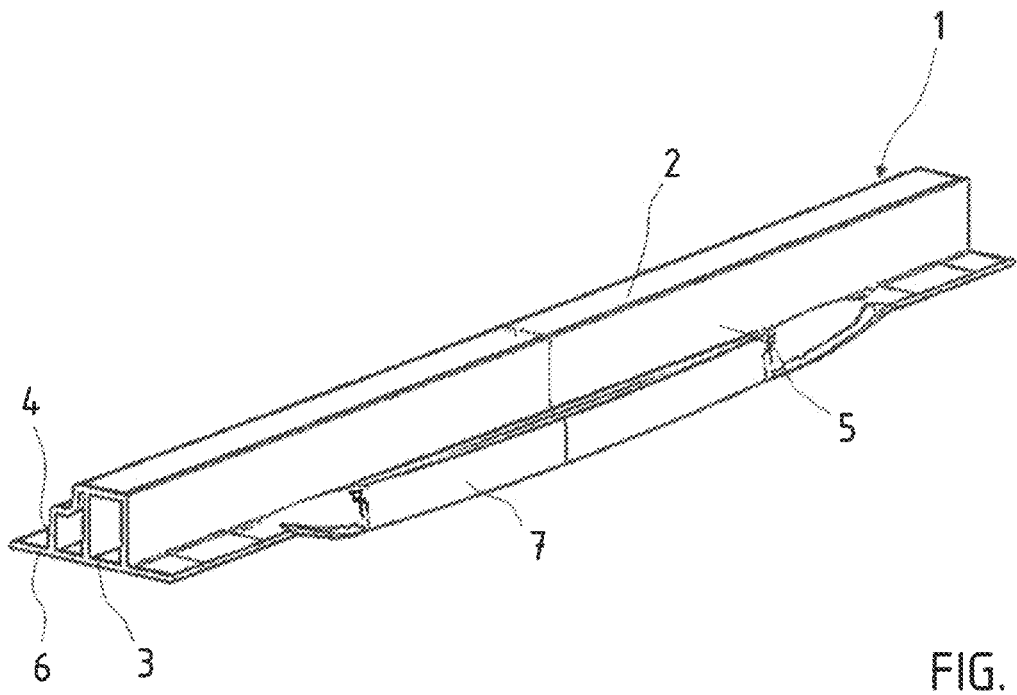
FIG. 5 is a perspective view of the hollow profile, depicting the partly separated flanges in a still further forming situation.
Figure 6:
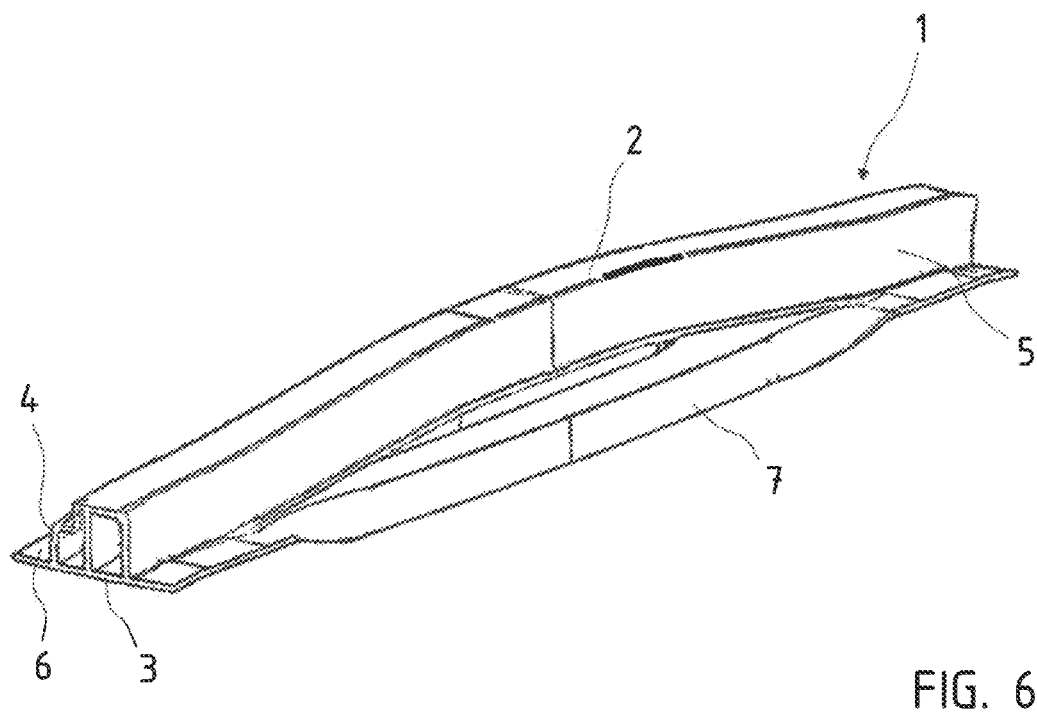
FIG. 6 is a perspective view of the hollow profile undergoing a bending operation.
Figure 7:
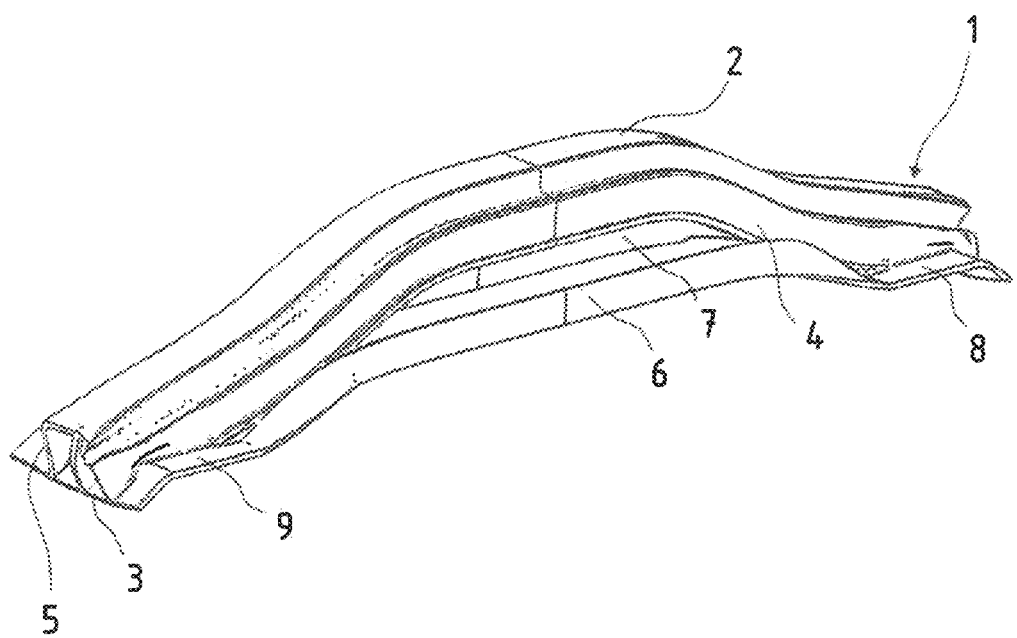
FIG. 7 is a perspective view of the hollow profile after having undergone the bending operation.

FIG. 5 shows the flange 7 after undergoing the afore-described forming operations and prior to shaping the hollow profile 1. FIG. 6 shows the hollow profile 1 undergoing a bending operation in which the hollow profile 1 is curved in an arched way toward the impact side, i.e, upwards in the drawing plane. As a result, a distance increases between the flanges 6, 7 and the rear side 3 of the hollow profile 1 in the central zone 11, i.e. where the separation cut 10 has been made. FIG. 7 shows the final state after undergoing the bending operation and prior to trimming the ends following the bending operation. The end zones 8, 9 constitute the rearmost regions of the hollow profile 1, so that the central zones 11 of the flanges 6, 7 do not jut out rearwards beyond the end zones 8, 9.

Figure 8:
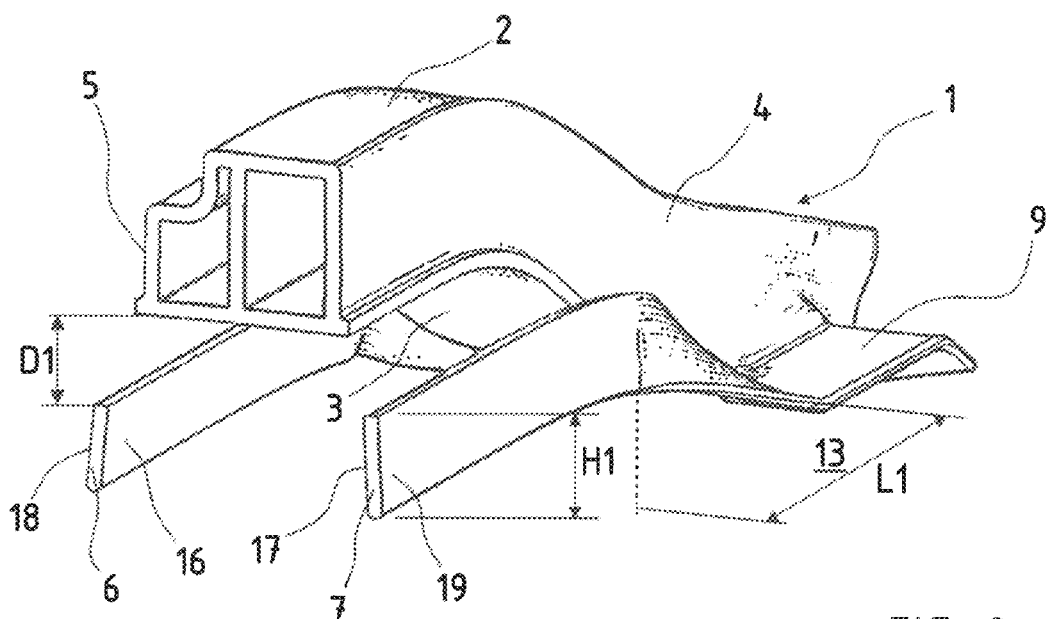
FIG. 8 is a cross sectional perspective view of the hollow profile before trimming its ends.

FIG. 8 is a cross sectional perspective view of the shaped hollow profile or bumper cross member 1. As is readily apparent, the flanges 6, 7 have in the central zone 11 a position in which their rear surfaces 16, 17 confront one another. The rear surfaces 16, 17 are not completely angled by 90° but still by more than 80°. Both flanges 6, 7 extend thus effectively in parallel relationship. The flanges 6, 7 are helically curved in the transition zones 13 and extend in the end zones 9 again substantially parallel in relation to the rear side 3. At this region, the flanges 6, 7 can be attached to a crash box which is not shown in greater detail here. The end zones 8, 9 shown in FIG. 8 still have to undergo a trimming operation. The thus produced bumper cross member 1 may then be calibrated and undergo a material removing operation, e.g. punching, cutting, to connect the structure to the motor vehicle. The flanges 6, 7 have a maximum distance D1 of 5-200 to the rear side 3.

Figure 9:
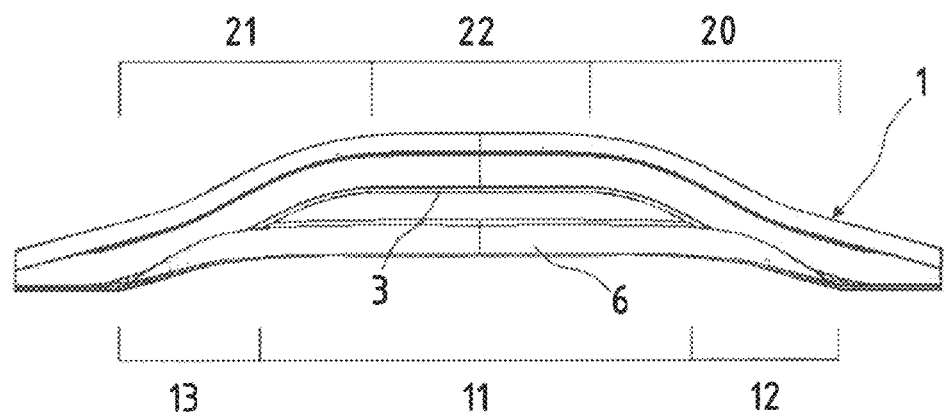
FIG. 9 is a top view of the finished bumper cross member after the ends have been trimmed.

The top view of FIG. 9 shows a final profile of the finished bumper cross member 1. A particular advantage of the bumper cross member 1 according to the present invention is the fact that the flanges 6, 7 with their confronting rear surfaces 16, 17 or confronting front surfaces 18, 19 assume in the central zone 11 a different function that in the end zones 8, 9. The flanges 6, 7 point upwards and downwards in the end zones 8, 9 and assume the function of allowing the bumper cross member 1 to be mounted to a motor vehicle, whereas the flanges 6, 7 are separated from the hollow profile 1 in the central zone 11 to thereby assume the function of a second cross member behind the first cross member or the function of a chord of an arc. The flanges 6, 7 serve as brace between the end zones 8, 9 and increase the section modulus of the overall bumper cross member 1 against deformations caused by an impact. In addition, a simple forming operation may be used to produce the flanges 6, 7 by a single manufacturing step, without the need for joining operations and without increase of the overall weight of the extruded hollow profile or finished bumper cross member 1.

The flanges 6, 7 have a uniform height H1 (FIG. 8). The twist of the flanges 6, 7 in the transition zones 12, 13 does not result in adverse microstructural changes and even effects a strain hardening in these zones. The transition zones 12, 13 have a length L1 which corresponds to about twice or three times the height H1 of the lower flange 7, as shown in FIG. 8. The upper flange 6 may have a height which is different as the height H1 of the lower flange 7.

In a manner not shown in greater detail, the separation cut 10 extends up to the transition zones 12, 13. As is readily apparent from FIG. 9, the transition zones 12, 13 of the flanges 6, 7 are shorter than transition zones 20, 21 of the hollow profile 1. The central zone 11 in relation to the flanges 6, 7 is accordingly greater than a central zone 22 of the hollow profile 1. In the area where the central zones 21, 22 overlap, the flanges 6, 7 extend in parallel relation to the hollow profile 1. As the hollow profile 1 is curved to a greater degree than the flanges 6, 7, the transition zones 20, 21 of the hollow profile 1 are wider. As a result, the free edge 15 in opposition to the separation cut edge 14 points away in the respective central zone 11, 22 from the rear side 3 of the hollow profile (or finished bumper cross member), but is also spaced in the central zone 22 of the hollow profile 1 at a significantly greater distance from the rear side 3 than in the transition zones 12, 13 of the flanges 6, 7.

Figure 10:
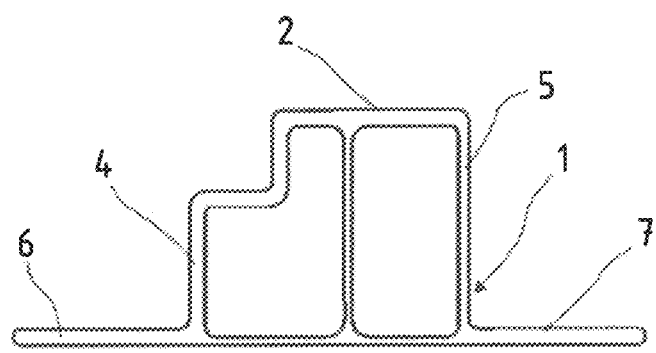
FIG. 10 is a cross section of the hollow profile of FIG. 1 before undergoing a forming operation.
Figure 11:
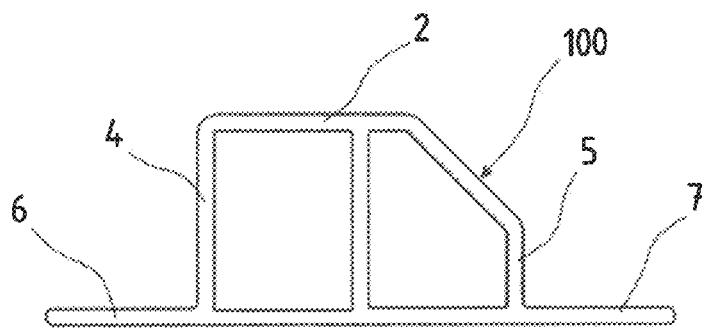
FIG. 11 is a cross section of another embodiment of a hollow profile for the production of a bumper cross member according to the present invention.

FIG. 10 shows a cross section of the hollow profile 1, whereas FIG. 11 shows a cross section of another embodiment of a hollow profile, generally designated by reference numeral 100, for the production of a bumper cross member according to the present invention. As is readily apparent, the hollow profiles 1, 100 involve multi-chamber designs with different corner configuration. By way of example, the hollow profiles 1, 100 have two chambers. The flanges 6, 7 lie in a plane with the rear side 3 and extend perpendicular from the top side 4 and the bottom side 5, respectively.

FIG. 12 shows a top view of a variation of a finished bumper cross member 1. Parts corresponding with those in FIG. 9 are denoted by identical reference numerals and not explained again. The description below will center on the differences between the embodiments. In this embodiment, the flanges 6, 7 are oriented such that in the central zone 11 their front surfaces 18, 19 point toward one another and their rear surfaces 16, 17 point outwards.

FIGS. 13*a* and 13*b* show cross sections of two configurations of bumper cross members 1. The flanges 6, 7 define an angle W which is positive +W, when the rear surfaces 18, 19 face one another and negative −W, when the front surfaces 16, 17 face one another. The angle W is greater than 60°.

Figures 14, 14A, 14B:
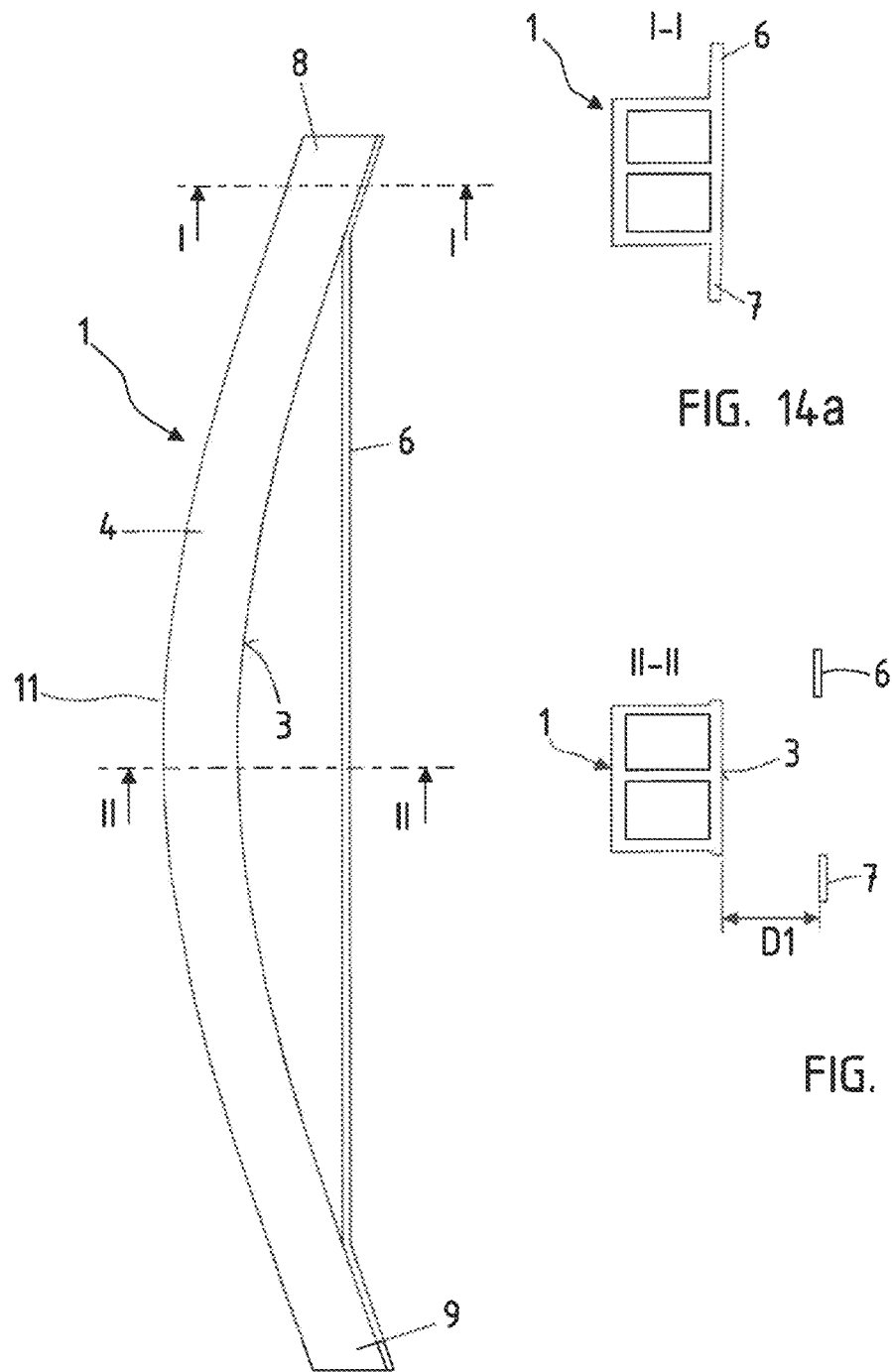
FIG. 14 is a top view a bumper cross member according to the present invention.
FIG. 14a is a cross section of the bumper cross member of FIG. 14, taken along the section line I-I in FIG. 14.
FIG. 14b is a cross section of the bumper cross member of FIG. 14, taken along the section line II-II in FIG. 14.

FIG. 14 is a top view a bumper cross member 1 according to the present invention, in which the flanges 6, 7 have not been twisted about their longitudinal axes. The flanges 6, 7 have in the central zone 11 a same orientation as in the end zones 8, 9, as can be seen from FIG. 14*a*, which is a section along section line I-I in FIG. 14. FIG. 14*b*, which is a section taken along section line II-II in FIG. 14, illustrates the maximum distance D1 between the flanges 6, 7 and the rear side 3 in the central zone 11. The hollow profile 1 is curved and may be stretched though a suitable forming operation, so that the flanges 6, 7 are stretched in the central zone 11.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A bumper cross member for a motor vehicle, said bumper cross member being produced from an extruded hollow profile and comprising:
   a front side forming an impact side;
   a rear side in opposition to the front side;
   end zones configured for connection to the motor vehicle;
   a central zone extending between the end zones and bent toward the impact side; and
   top and bottom sides connecting the rear side with the front side and each having a projecting flange which is separated from the rear side by a separation cut configured to end shy of the end zones so that the flanges are connected with the bumper cross member in the end zones.

2. The bumper cross member of claim 1, wherein the flange has a front surface and a rear surface, with the front surfaces or the rear surfaces of the flanges facing one another in the central zone.

3. The bumper cross member of claim 2, wherein the front surfaces or the rear surfaces of the flanges define in the central zone an angle in a range of maximal 60°.

4. The bumper cross member of claim 2, wherein the rear surfaces of the flanges and the rear side have a same orientation in the end zones.

5. The bumper cross member of claim 2, further comprising transition zones between the central zone and the end zones, with the front surfaces and the rear surfaces of the flanges in the transition zones having an orientation which is twisted in a gradual manner.

6. The bumper cross member of claim 5, wherein the transition zones have each a length and the flanges have each a height, with the length of the transition zone corresponding to at least twice the height of the flange.

7. The bumper cross member of claim 5, wherein the separation cut extends up to the transition zones.

8. The bumper cross member of claim 1, wherein the flanges are configured in a direction toward the impact side with a curvature which is smaller to the impact side than a curvature of the hollow profile toward the impact side, so that the flanges, when viewed from the impact side, are spaced in the central zone from the rear side by a distance.

9. The bumper cross member of claim 8, wherein the distance is in a range of 5 to 200 mm.

10. The bumper cross member of claim 1, wherein the flanges have a separation cut edge and a free edge in opposition to the separation cut edge, with the free edge pointing away from the rear side in the central zone.

11. The bumper cross member of claim 1, wherein the hollow profile is embodied as a circumferentially closed hollow profile with at least one chamber.

12. A method for the production of a bumper cross member, said method comprising:
   forming an extruded hollow profile with a hollow chamber and upper and lower sides each with flanges directed in opposite directions;
   partly separating the flanges by shifting a stamping tool in a direction from a front side to a rear side of the hollow profile and separating the flanges in a central zone of the hollow profile; and
   bending the central zone of the hollow profile in a direction of the front side so as to increase a distance of the flanges from the rear side in the central zone.

13. The method of claim 12, further comprising forming the flanges in the central zone such that front surfaces or rear surfaces of the flanges face one another in the central zone.

14. The method of claim 12, further comprising stretching the central zone.

\* \* \* \* \*